United States Patent
Tsai et al.

(10) Patent No.: US 10,475,205 B2
(45) Date of Patent: Nov. 12, 2019

(54) POSITIONING AND MEASURING SYSTEM BASED ON FLEXIBLE FEATURE IMAGE SCALE

(71) Applicant: National Tsing Hua University, Hsinchu (TW)

(72) Inventors: Hung-Yin Tsai, Hsinchu (TW); Yu-Chen Wu, Kaohsiung (TW); Wei-Cheng Pan, New Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 176 days.

(21) Appl. No.: 15/821,336

(22) Filed: Nov. 22, 2017

(65) Prior Publication Data
US 2019/0080469 A1 Mar. 14, 2019

(30) Foreign Application Priority Data
Sep. 13, 2017 (TW) .............................. 106131357 A

(51) Int. Cl.
G06T 7/73 (2017.01)
G01B 11/00 (2006.01)
(Continued)

(52) U.S. Cl.
CPC .............. G06T 7/73 (2017.01); G01B 11/005 (2013.01); G06K 9/209 (2013.01); G06K 9/3208 (2013.01); G06K 9/342 (2013.01)

(58) Field of Classification Search
None
See application file for complete search history.

(56) References Cited

U.S. PATENT DOCUMENTS

| 6,819,779 B1 * | 11/2004 | Nichani | G06K 9/00798 |
| | | | 382/104 |
| 9,569,673 B2 * | 2/2017 | Renner | G06K 9/00798 |

(Continued)

FOREIGN PATENT DOCUMENTS

| CN | 103302162 B | 2/2015 |
| CN | 102891966 B | 7/2015 |
| TW | 201026428 A1 | 7/2010 |

OTHER PUBLICATIONS

Govindu, Venu Madhav. "Lie-algebraic averaging for globally consistent motion estimation." Proceedings of the 2004 IEEE Computer Society Conference on Computer Vision and Pattern Recognition, 2004. CVPR 2004.. vol. 1. IEEE, 2004. (Year: 2004).*

(Continued)

*Primary Examiner* — Michelle M Entezari
(74) *Attorney, Agent, or Firm* — Muncy, Geissler, Olds & Lowe, P.C.

(57) ABSTRACT

A positioning and measuring system includes: an image capturing device performing image capturing operations on an object; a driving mechanism mechanically connected to one or both of the image capturing device and the object to cause a relative movement between the image capturing device and the object; and a processor electrically connected to the image capturing device and the driving mechanism and performing steps of: controlling the image capturing device to capture N portions of the object to generate N images before and after controlling the driving mechanism to cause M relative movements between the object and the image capturing device; and extracting feature points of each of the N images corresponding to unique surface morphology of the object and respectively performing cross-image feature point matching according to the feature points (Continued)

of every neighboring two of the N images to obtain information of the M relative movements.

8 Claims, 6 Drawing Sheets

(51) Int. Cl.
*G06K 9/34* (2006.01)
*G06K 9/32* (2006.01)
*G06K 9/20* (2006.01)

(56) References Cited

U.S. PATENT DOCUMENTS

| | | | | |
|---|---|---|---|---|
| 9,940,535 | B1* | 4/2018 | Obotnine | G06K 9/209 |
| 9,948,999 | B2* | 4/2018 | Havekes | H04N 5/247 |
| 10,262,197 | B2* | 4/2019 | Lin | G01B 11/285 |
| 2006/0140463 | A1* | 6/2006 | Rutschmann | A61B 5/0064 |
| | | | | 382/128 |
| 2011/0228050 | A1 | 9/2011 | Wang et al. | |
| 2012/0093361 | A1* | 4/2012 | Huang | G06T 7/277 |
| | | | | 382/103 |
| 2014/0272773 | A1* | 9/2014 | Merritt | A61B 5/0088 |
| | | | | 433/29 |
| 2015/0170367 | A1* | 6/2015 | Nachman | G06K 9/00671 |
| | | | | 382/106 |
| 2015/0268033 | A1 | 9/2015 | Troy et al. | |
| 2016/0093058 | A1* | 3/2016 | Moteki | G06T 7/73 |
| | | | | 382/154 |
| 2017/0242421 | A1* | 8/2017 | Ghazizadeh | C12N 15/1065 |
| 2018/0315221 | A1* | 11/2018 | Jones | G06T 11/005 |

OTHER PUBLICATIONS

Rajagopalan, A. N., and Subhasis Chaudhuri. "A variational approach to recovering depth from defocused images." IEEE transactions on pattern analysis and machine intelligence 19.10 (1997): 1158-1164. (Year: 1997).*

Schunck B.G. (1988) Image Flow: Fundamentals and Algorithms. In: Martin W.N., Aggarwal J.K. (eds) Motion Understanding. The Kluwer International Series in Engineering and Computer Science (Robotics: Vision, Manipulation and Sensors), vol. 44. Springer, Boston, MA (Year: 1988).*

Musman, S., Kerr, D., & Bachmann, C. (1996). Automatic recognition of ISAR ship images. IEEE Transactions on Aerospace and Electronic Systems, 32(4), 1392-1404. (Year: 1996).*

Wang, J. Y., & Adelson, E. H. (1994). Representing moving images with layers. IEEE Transactions on Image Processing, 3(5), 625-638. (Year: 1994).*

Taiwan Patent Office. Office Action, 106131357, dated Feb. 18, 2018. 9 pages.

* cited by examiner

US 10,475,205 B2

POSITIONING AND MEASURING SYSTEM BASED ON FLEXIBLE FEATURE IMAGE SCALE

CROSS-REFERENCE TO RELATED APPLICATIONS

This application claims priority of No. 106131357 filed in Taiwan R.O.C. on Sep. 13, 2017 under 35 USC 119, the entire content of which is hereby incorporated by reference.

BACKGROUND OF THE INVENTION

Field of the Invention

The invention relates to a positioning and measuring system, and more particularly to a positioning and measuring system based on a flexible feature image scale.

Description of the Related Art

At present, most of objects and platforms of various machine tools are positioned using optical scales, magnetic scales and the like. However, the conventional scales tend to be affected by the mounting position, the geometric properties of the mechanism of the machine or the price, and the applications and the measurements are thus restricted. Most optical scales and magnetic scales cannot provide other utilizations in the operation processes, and the information used in the operation processes only can position the specific direction. If the machining characteristics of the object are to be measured, or the multi-direction positioning needs to be performed, other auxiliary tools are needed.

Regarding to the high-accuracy object measurement, the development is performed in the direction toward the three-dimensional object measurement at present. Contact and contactless methods may be used in the three-dimensional measurement equipment. For example, China Patent No. CN103302162B discloses a mold positioning method based on feature distances, wherein a contact sensor (probe) is adopted to measure feature distances of the selected feature points on the object, and the correction and positioning are then performed. However, such contact measurement method has the time-consuming drawback, the accuracy thereof may be affected by the control system and other parts of the machine, and the contact measurement method cannot be used in a flexible manner.

SUMMARY OF THE INVENTION

It is therefore an objective of the invention to provide a positioning and measuring system based on a flexible feature image scale, wherein the image positioning, the specific dimension measurement of an object and the flexible reference positioning functions can be achieved according to the unique surface morphology of the to-be-machined or measured object.

To achieve the above-identified objective, the invention provides a positioning and measuring system based on a flexible feature image scale. The positioning and measuring system includes: an image capturing device performing image capturing operations on an object; a driving mechanism mechanically connected to one or both of the image capturing device and the object to cause a relative movement between the image capturing device and the object; and a processor, which is electrically connected to the image capturing device and the driving mechanism and performs steps of: controlling the image capturing device to capture N portions of the object to generate N images before and after controlling the driving mechanism to cause M relative motions between the object and the image capturing device, where N is a positive integer greater than or equal to 2, M is equal to (N−1), and neighboring two of the N images partially overlap with each other; and extracting feature points of each of the N images, and respectively performing cross-image feature point matching according to the feature points of every neighboring two of the N images to obtain information of the M relative motions, wherein the feature points correspond to unique surface morphology of the object.

With the above-mentioned aspect, when every object is formed, manufactured or machined, the object has the unique surface morphology, wherein the unique surface morphology of the to-be-machined or measured object is utilized to achieve the image positioning, the specific dimension measurement and the flexible reference positioning functions.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
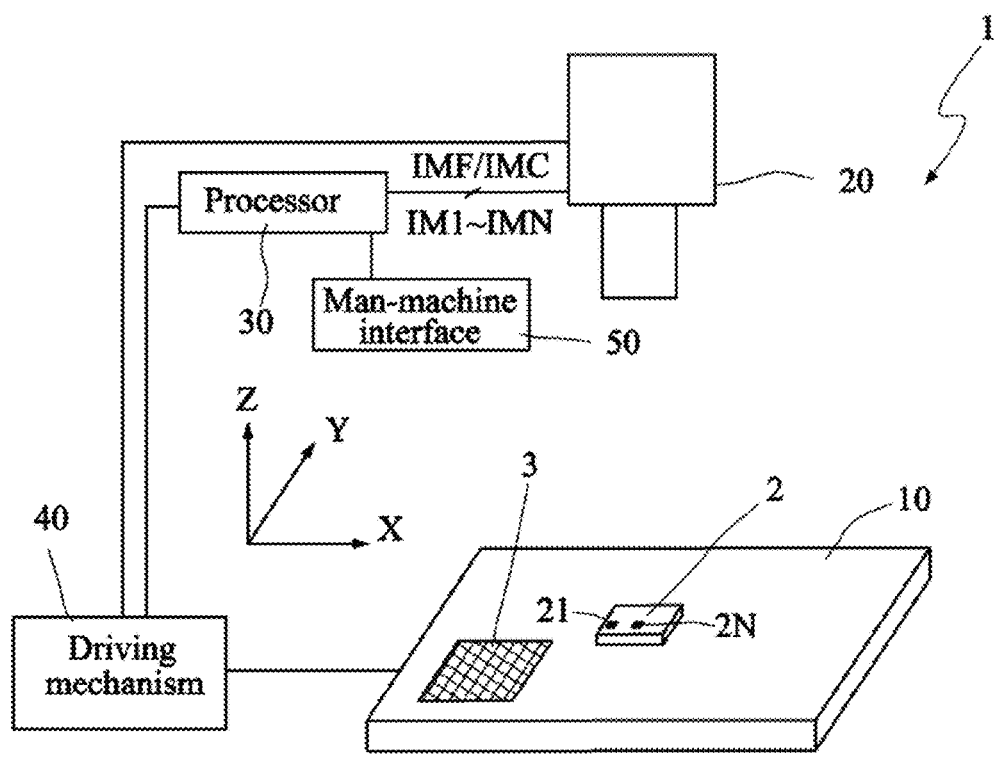
FIG. 1 is a schematic view showing a positioning and measuring system according to a preferred embodiment of the invention.

In this invention, feature point matching between different images is performed to obtain the pixel motion information according to which the positioning is performed, wherein the invention is not restricted to the feature point recognizing and matching in one single image, and the effect of flexible use can be achieved.

In the embodiment of the invention, the machine vision works in conjunction with the image processing method to constitute an optical image positioning and object measuring system applied to a machining platform. The system has the following main functions. First, the image positioning function is provided, wherein a positioning point is specified in conjunction with cross-image feature point searching and matching, and calculation is made to obtain a positioning position of a specific feature or machining portion. That is, the positioning and measuring system may work in conjunction with a processing machine, such as a drilling machine, milling machine, lathe, grinding machine, wire cutting machine or laser processing machine, to constitute a processing machining system. Because the positioning is made when the processing is performed, the surface morphology of the object is changed. That is, the feature points are changed. Second, the function of measuring the specific dimension of the object is obtained, wherein specific object edges are extracted by way of image processing working in conjunction with the cross-image feature point searching and matching to obtain the dimension of the object after calculating. Third, the flexible reference positioning function is obtained, wherein the user specifies a processing reference position on the object and correspondingly performs the feature searching and matching to achieve the back-and-forth positioning adapted to multiple movements of the platform.

In the actual operation, this embodiment adopts a high magnification (the maximum magnification is 4.5) visible light camera to work with an three-axis (XYZ) mobile platform, wherein a calibration sheet is used to obtain the reference scale for the real dimension, and the captured object is a block gauge. First, the camera is focused with different focal lengths on the calibration sheet to obtain different calibration sheet images, which are transformed into the frequency domain by way of Fourier transform (FT), and the best focal length is obtained by way of calculation according to the spectrograms. Then, the real-dimension image scale is obtained after the image dimension is converted according to the known stripe pitch under the fixed magnification. Next, the platform is moved, and multiple images of the object are captured. After the positioning point in the reference image is selected, feature points in different images are searched according to the speeded up robust features (SURF) algorithm, for example, and cross-image matching is performed to achieve the cross-image positioning. In the aspect of the specific dimension measurement, the contour geometry to be obtained is extracted by way of image processing, object motion information is obtained according to the feature point matching, and the dimension can be obtained after corresponding calculation. With the above-mentioned embodiment, it is possible to provide a system reaching an accuracy level of microns, wherein the test result on a sample (4 mm) has the measurement error smaller than 2 μm (the average is 1.33 μm), and the test result on another sample (10 mm) has the measurement error smaller than 4 μm (the average is 3.3 μm).

Figure 2:
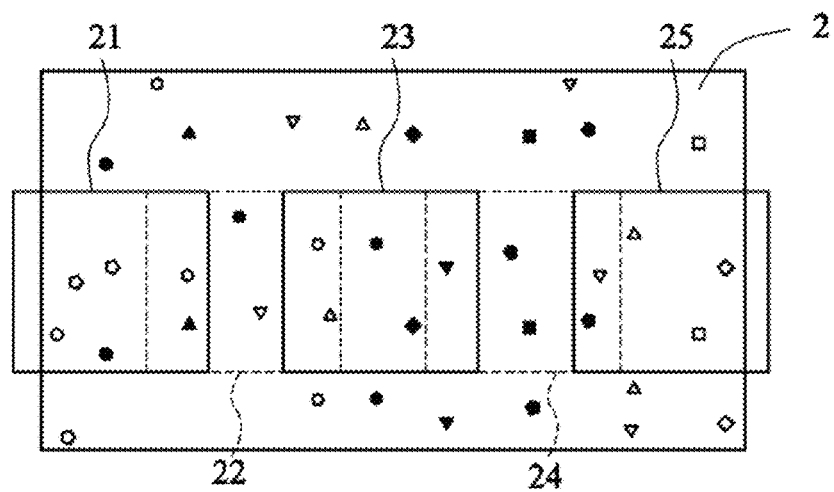
FIG. 2 is an enlarged partial view showing an object.

FIG. 1 is a schematic view showing a positioning and measuring system according to a preferred embodiment of the invention. FIG. 2 is an enlarged partial view showing an object. Referring to FIGS. 1 and 2, this embodiment provides a positioning and measuring system 1 based on a flexible feature image scale. The positioning and measuring system 1 includes an image capturing device 20, a driving mechanism 40 and a processor 30, wherein X, Y and Z coordinate axes are depicted in FIG. 1.

The image capturing device 20 is a camera, for example, and performs image capturing operations on an object 2. In one example, the lens magnification of the main camera can be switched. After calculation and in the condition where the lens is switched to the highest magnification, the overall field of vision ranges from about 1.3 mm×1.1 mm, wherein one pixel can record the information of the actual object of about 1.06 μm×1.06 μm (especially 1.054 μm×1.054 μm); and in the condition where the lens is switched to the lowest magnification, the overall field of vision ranges from about 8.2 mm×6.5 mm, wherein one pixel can record the information of the actual object of about 6.4 μm×6.4 μm.

The driving mechanism 40 is mechanically connected to one or both of the image capturing device 20 and the object 2 to cause a relative movement between the image capturing device 20 and the object 2.

The processor 30 includes, for example but without limitation to, a central processing unit (CPU) of a computer or an electronic device. The processor 30 electrically connected to the image capturing device 20 and the driving mechanism 40 performs steps (a) and (b). In the step (a), before and after controlling the driving mechanism 40 to cause M relative motions between the object 2 and the image capturing device 20, the image capturing device 20 is controlled to capture N portions 21 to 2N of the object 2 to generate N images IM1 to IMN, where N is a positive integer greater than or equal to 2, M is equal to (N−1), and every neighboring two of the N images IM1 to IMN partially overlap with each other. In this embodiment, N is equal to 5, and M is equal to 4. Thus, the image capturing device 20 captures five portions 21 to 25 of the object 2 to generate five images IM1 to IM5, and the driving mechanism 40 causes four relative motions between the object 2 and the image capturing device 20. It is worth noting that the information of the M relative motions includes one or both of translation information and rotation information.

Figure 3:
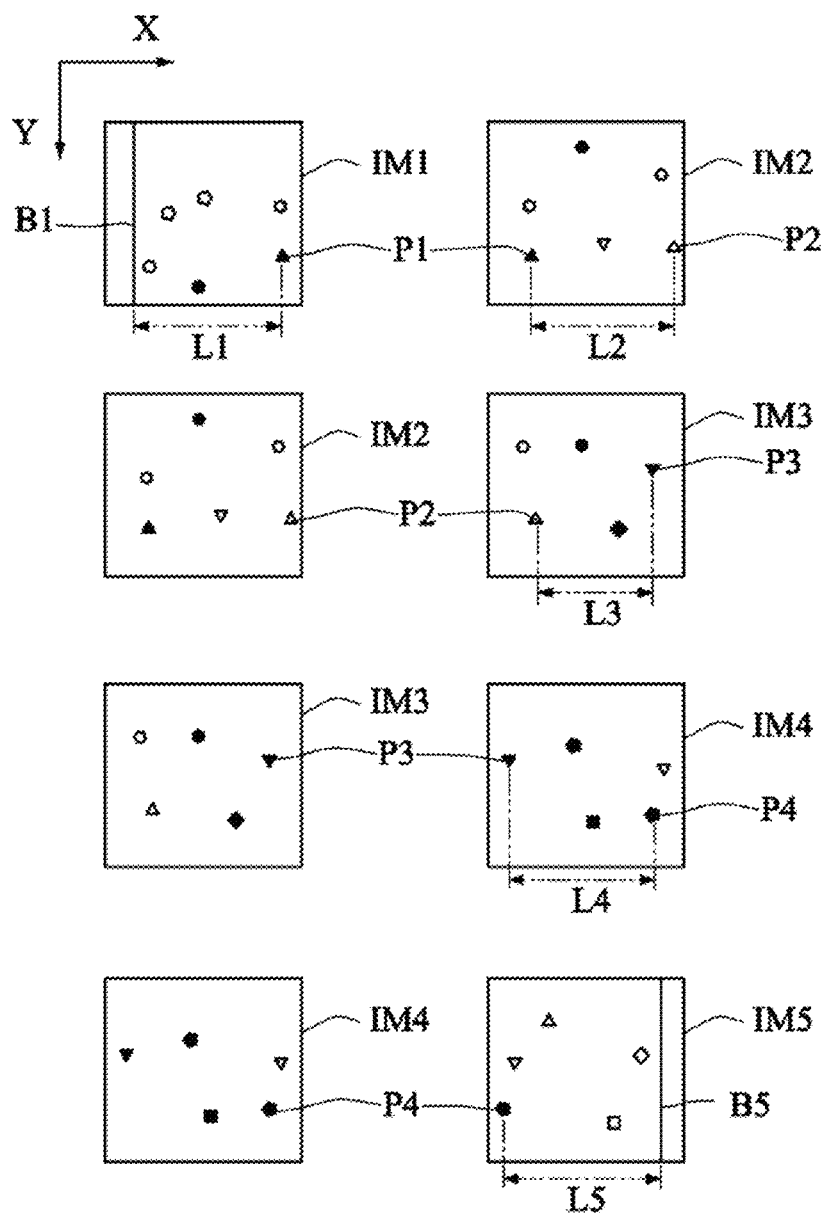
FIG. 3 is a schematic view showing cross-image feature point matching.

FIG. 3 is a schematic view showing cross-image feature point matching. As shown in FIG. 3, in the step (b), the processor 30 extracts feature points of each of the N images IM1 to IMN (the feature points include the labeled feature points P1 to P4 and other feature points that are not labeled), and respectively performs cross-image feature point matching according to the feature points of every neighboring two of the N images IM1 to IMN to obtain the information of the M relative motions, wherein the feature points correspond to unique surface morphology of the object 2.

Of course, the positioning and measuring system 1 may further include a platform 10 supporting the object 2. The driving mechanism 40 drives the object 2 to generate the M relative motions through the platform 10. One single distance of each of the M relative motions may be obtained through the cross-image feature point matching method. For example, in FIG. 3, the relative movement distance between the images IM1 and IM2 corresponds to the difference between the pixel coordinates (e.g., (9,7)) of the feature point P1 of the image IM1 and the pixel coordinates (e.g., (3,7)) of the feature point P1 of the image IM2, and is equivalent to six (9−3=6) pixels, wherein six pixels are multiplied with the ratio of the scale to obtain the length unit.

According to the above-mentioned feature point matching information, the flexible reference positioning function can be achieved. For example, in a positioning mode, the processor 30 further performs a step of: (c) judging whether the information of the M relative motions reaches required set information, and controlling the driving mechanism 40 to cause an additional relative motion between the object 2 and the image capturing device 20 if the information of the M relative motions does not reach the required set information; and (d) repeating steps (a) to (c) until the information of the M relative motions reaches the required set information.

According to the above-mentioned feature point matching information, it is possible to achieve the function of measuring the specific dimension of the object. For example, the processor 30 may further perform the step of detecting whether each of the N images IM1 to IMN contains a boundary B1 of the object 2, selecting two images of the N images IM1 to IMN containing the two boundaries BM with opposite orientations as two boundary images, and calculating a distance between the two opposite boundaries B1 and BM (seen at opposite sides of the images IM1 and IM5) according to the two boundary images and information of an accumulated motion of the relative motions corresponding to the two boundary images. For example, the processor 30 obtains the distance (=L1+L2+L3+L4+L5) by adding the two partial lengths L1 and LN (L5) corresponding to the object 2 in the two boundary images IM1 and IMN (IM5) of the object 2 to lengths L2, L3 and L4 of an accumulated motion of the images covering the two boundary images in a distance measuring mode.

In addition, the positioning and measuring system 1 may further include a man-machine interface 50, which is electrically connected to the processor 30 and receives a positioning point inputted by a user. The processor 30 performs the cross-image feature point matching according to the positioning point. The positioning point may be one of these feature points, and may also be different from the feature points. For example, a positioning point needs to be specified in the processing process of the machine tool. If the user wants to process the workpiece, a positioning or dimensioning reference point for establishing the coordinate positions in all processing steps needs to be present on the engineering drawing, and may be referred to as an original. The work of specifying the positioning point is typically done on the machine tool when the tool is moved to the reference point and then zeroed. The zeroing operation is to actually specify the positioning reference point. The user may freely specify the point on the image as the reference positioning point corresponding to the engineering drawing. That is, the subsequent pixel coordinate positioning is done based on the positioning point as the starting point.

In order to determine the scale corresponding to the magnification power, the processor 30 may further perform, before the step (a), steps of: (a1) controlling the image capturing device 20 to capture a calibration sheet 3 with a magnification power to obtain a calibration sheet image, wherein the image capturing device 20 captures the calibration sheet 3 and the object 2 with this magnification power; and (a2) processing the calibration sheet image to obtain a dimension of one pixel, wherein the processor 30 further determines a dimension corresponding to the information of the M relative motions according to the information of the M relative motions and the dimension of the pixel.

In order to achieve the good focusing condition, in the step (a1), the processor 30 controls the image capturing device 20 to capture the calibration sheet 3 with multiple focal lengths to obtain multiple focusing images IMF, transforms the focusing images IMF into a frequency domain to obtain multiple spectrograms, selects one of the spectrograms, which has a most obvious signal presented in an intermediate frequency portion, and captures the calibration sheet 3 with the focal length corresponding to the spectrogram to obtain the calibration sheet image.

Figure 4:
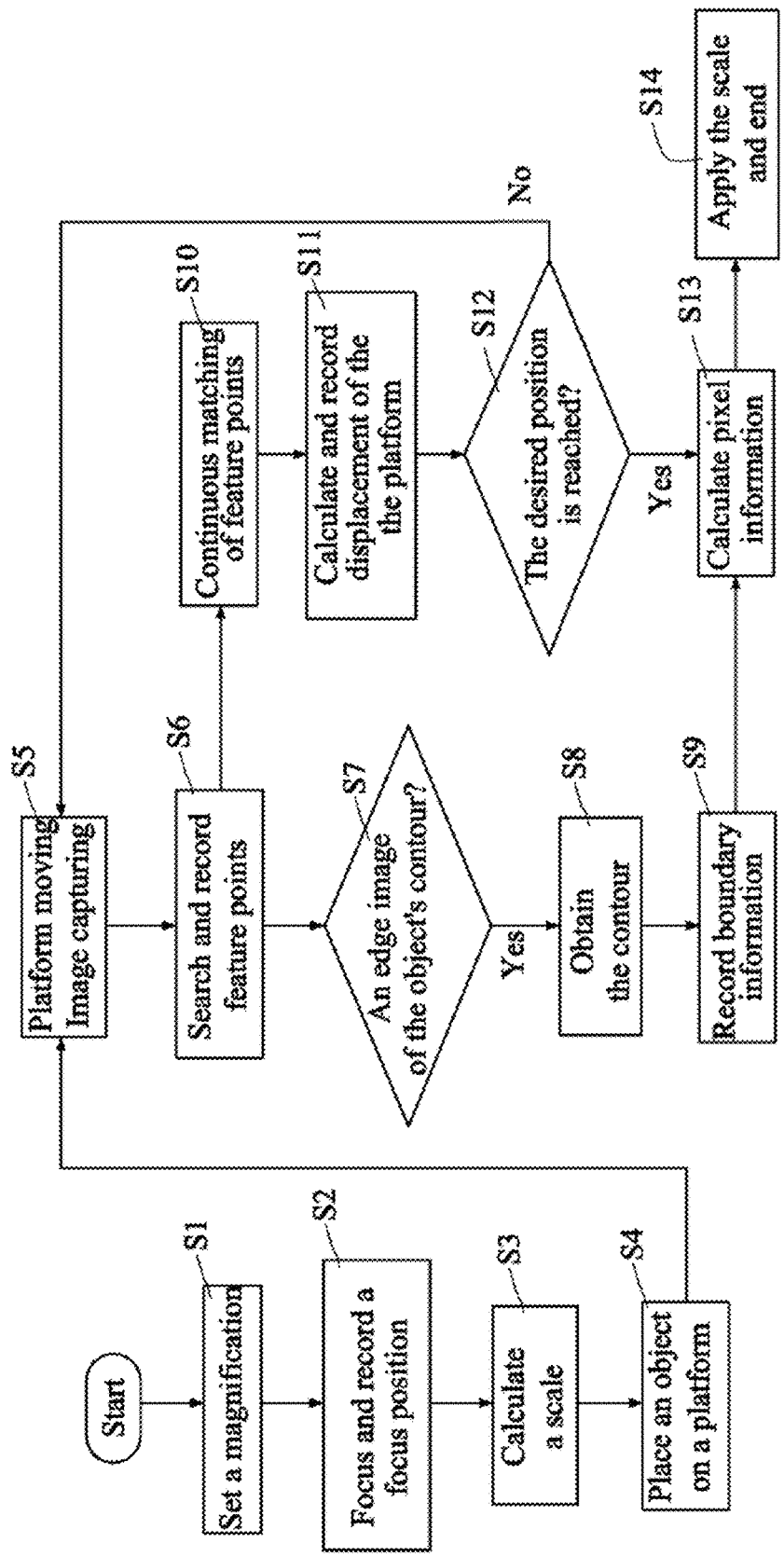
FIG. 4 is a flow chart showing an operation method of the positioning and measuring system.
Figure 5:
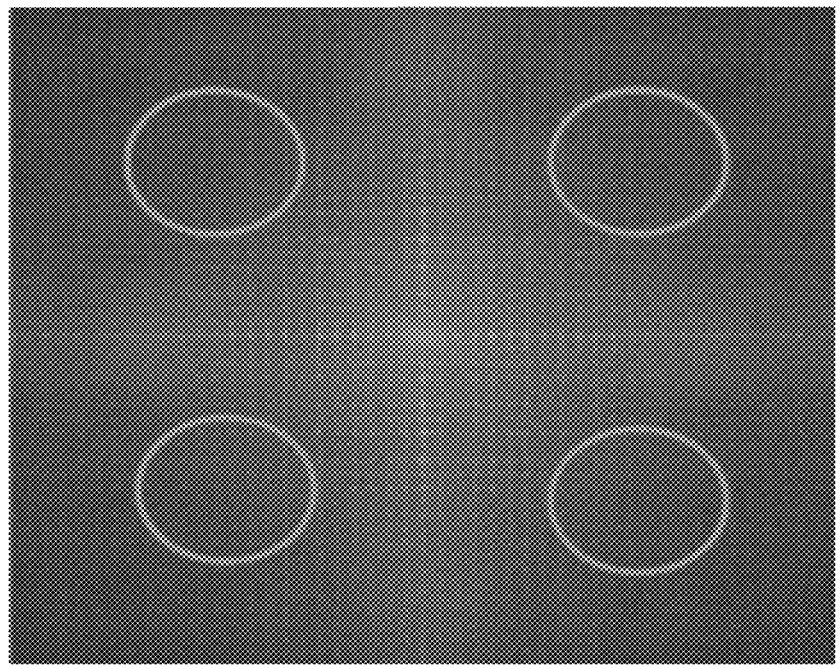
FIG. 5 shows intermediate frequency portions (circled portions) for focus analysis in the spectrogram.

FIG. 4 is a flow chart showing an operation method of the positioning and measuring system. Referring to FIG. 4, the magnification of the camera, such as 4.5, is firstly set (step S1). Then, focusing is performed and the focus position of the platform is recorded (step S2) according to the above-mentioned spectrograms, wherein one actual example of the spectrogram is shown in FIG. 5, wherein in the images where the focus is good and poor, the greater difference is present between the signals of the intermediate frequency portions. If the intermediate frequency portion has the more obvious signal, it represents that the image focus degree is better. Then, it is judged whether the focus is completed by comparing with the actually captured image, wherein FIG. 5 shows the well focused state.

Figure 6:
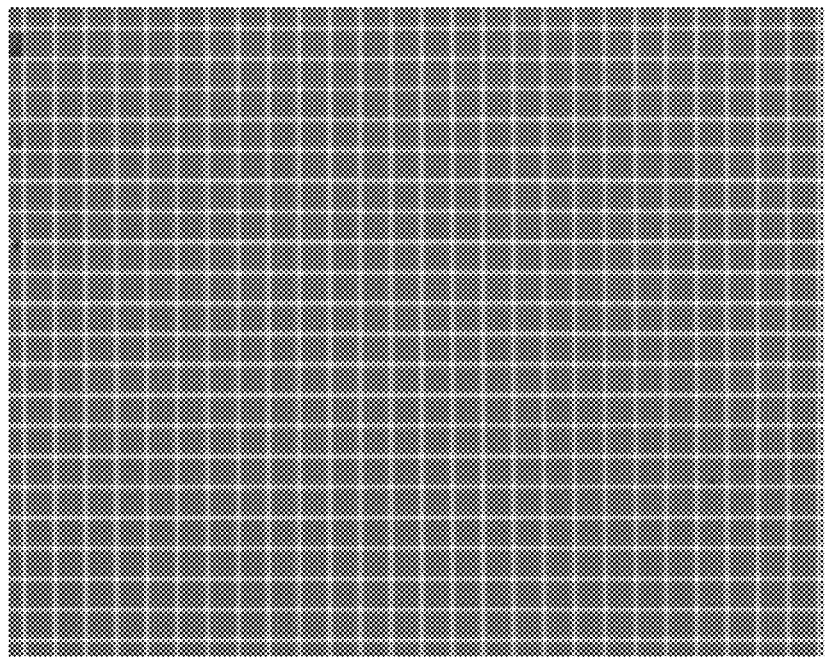
FIG. 6 shows a well focused image of a calibration sheet.

Next, the calibration sheet is captured and the scale is calculated (step S3). FIG. 6 shows a well focused image of a calibration sheet. Then, the object is placed on the platform (step S4). Next, the images of the object are captured before and after the platform is moved (step S5). Of course, the images of the object in the same state need not to be captured repeatedly. Then, feature point searching and recording are performed on the images of the object (step S6). Next, it is judged whether the edge image of the contour of the object is present (step S7). That is, it is judged whether the boundary images IM1 and IM5 in FIG. 3 are present. If yes, the algorithm of obtaining the contour of the object is performed (step S8) and the boundary information is recorded (step S9). Then, the information of all pixels is calculated (step S13). Then, the scale is applied to finish the measurement (step S14). The continuous matching of the feature points may also be performed according to the result of the step S6 (step S10), and then the displacement of the platform is calculated according to the matching result, and the displacement is recorded (step S11). Next, it is judged whether the object has reached the desired position (step S12). If not, the process returns to the step S5 so that the flexible reference positioning function can be achieved. If yes, the information of all pixels is calculated (step S13), and then the scale is applied to finish the positioning or measuring (step S14).

Figure 7:
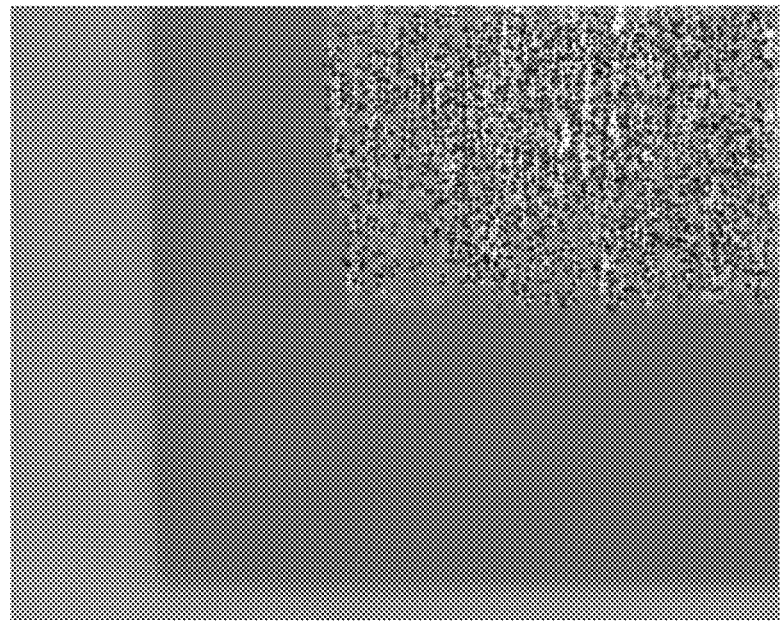
FIGS. 7 and 8 show feature point extracting results of two neighboring images.
Figure 8:
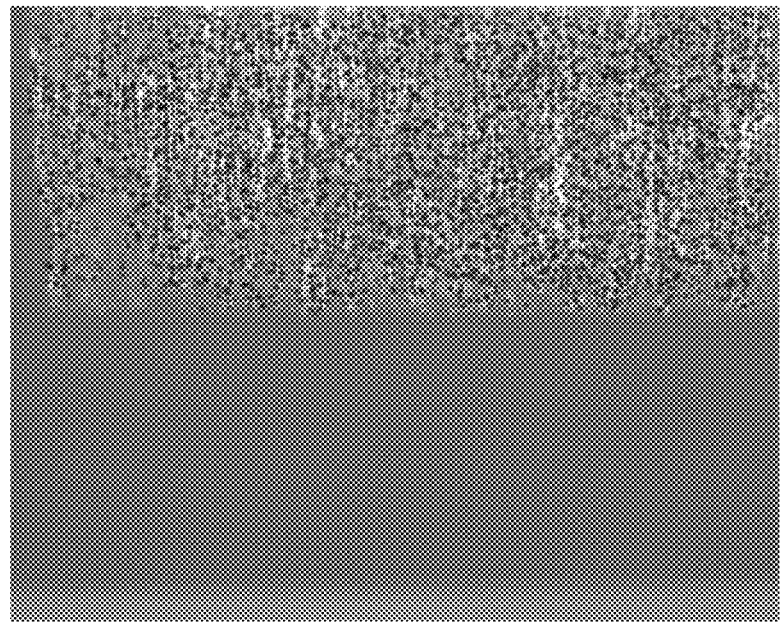
Figure 9:
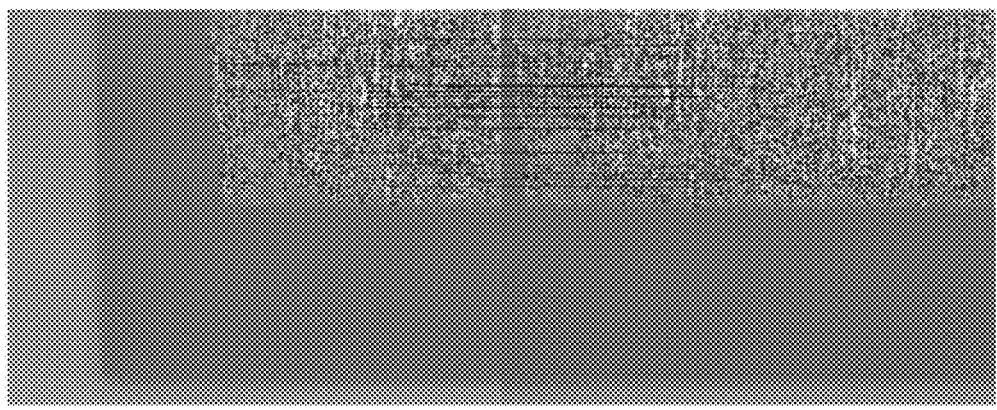
FIG. 9 shows feature point matching results of FIGS. 7 and 8.

The algorithm of obtaining the contour of the object may be performed by the steps of: converting the image into a gray scale image, gray scale correction and binarization processes are performed, and Sobel edge detection and Houghline line segment detection are performed. Regarding to the feature point matching and tracking, feature points in the images are adopted in this embodiment, and cross-image matching is performed to determine the pixel positions of the feature points and motion tracking of the feature points, and the position change of the real platform is obtained by way of conversion, so that the position of the positioning point and the dimension of the object can be further obtained. In one example, two neighboring images having an overlapped region are selected, and several feature points, which may serve as positioning tracking points, are extracted from the images by the SURF feature point searching method. The results of the feature points of the two neighboring images are shown in FIGS. 7 and 8, wherein the circles denote the feature points. Then, the fast library for approximate nearest neighbors (FLANN) feature point matching is performed on two images, which have the overlapped region and carry the information of the feature points, and the results are shown in FIG. 9, wherein multiple connection lines across the images denote the combinations of the successfully matched feature points. It is worth noting that FLANN is a library in the presently developed platform of openCV. Actually, the matching may also be performed using another method, so the invention is not restricted thereto.

In addition, another application of determining whether a relative rotation between the platform and the object is present, and determining the rotation degree therebetween may be induced according to the displacement data of the captured feature point matching. Because the feature point searching method (SURF) used in this embodiment has the rotation invariance, feature point matching still can be performed even if the object is rotated. Thus, it is possible to observe X and Y direction displacement values of different feature points from various matching combinations. If the displacement values are not in a mess and have a specific relationship, the possibility of errors can be almost eliminated, and it is inferred that the rotation between the object and the platform is present. After the equivalent radius and the center of rotation are further calculated, the rotation degree can be measured.

In the above-mentioned embodiment, calculating and positioning are performed based on the feature points. Therefore, whatever the to-be-positioned or measured object or platform is, the positioning and measuring system is based on the flexible feature image scale according to the invention as long as the feature points can be found in the captured image under the feature algorithm and the cross-image matching can be successfully implemented. This is because the feature points may function as the positioning marks of the image scale. To sum up, every object has the unique surface morphology when being formed, manufactured or processed, and the image positioning, the specific dimension measurement of the object and the flexible reference positioning functions can be achieved according to the unique surface morphology of the to-be-machined or measured object.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A positioning and measuring system, comprising:
   an image capturing device performing image capturing operations on an object;
   a driving mechanism mechanically connected to one or both of the image capturing device and the object to cause a relative movement between the image capturing device and the object; and
   a processor, which is electrically connected to the image capturing device and the driving mechanism and performs steps of:
   (a) controlling the image capturing device to capture N portions of the object to generate N images before and after controlling the driving mechanism to cause M relative motions between the object and the image capturing device, where N is a positive integer greater than or equal to 2, M is equal to (N−1), and neighboring two of the N images partially overlap with each other;
   (b) extracting feature points of each of the N images, and respectively performing cross-image feature point matching according to the feature points of every neighboring two of the N images to obtain information of the M relative motions, wherein the feature points correspond to unique surface morphology of the object; and
   (c) detecting whether each of the N images contains a boundary of the object, selecting two images of the N images containing the two boundaries of the object that are seen at opposite sides of the two images as two boundary images of the object, and calculating a distance between the two opposite boundaries of the object inside the two boundary images according to the two boundary images and information of an accumulated motion of the relative motions corresponding to the two boundary images of the object in a distance measuring mode, wherein the distance is obtained by adding two partial lengths corresponding to the object in the two boundary images to lengths of the accumulated motion of the images covering the two boundary images.

2. The positioning and measuring system according to claim 1, further comprising a platform supporting the object, wherein the driving mechanism drives the object to generate the M relative motions through the platform.

3. The positioning and measuring system according to claim 1, further comprising a man-machine interface, which is electrically connected to the processor and receives a positioning point inputted by a user, wherein the processor performs the cross-image feature point matching according to the positioning point.

4. The positioning and measuring system according to claim 3, wherein the positioning point is different from the feature points.

5. The positioning and measuring system according to claim 1, wherein the information of the M relative motions comprises one or both of translation information and rotation information.

6. The positioning and measuring system according to claim 1, wherein in a positioning mode, the processor further performs steps of:
   (d) judging whether the information of the M relative motions reaches required set information, and controlling the driving mechanism to cause an additional relative motion between the object and the image capturing device if the information of the M relative motions does not reach the required set information; and
   (e) repeating steps (a), (b) and (d) until the information of the M relative motions reaches the required set information.

7. The positioning and measuring system according to claim 1, wherein the processor further performs, before the step (a), steps of:
   (a1) controlling the image capturing device to capture a calibration sheet with a magnification power to obtain a calibration sheet image, wherein the image capturing device captures the calibration sheet and the object with the magnification power; and
   (a2) processing the calibration sheet image to obtain a dimension of one pixel, wherein the processor further determines a dimension corresponding to the information of the M relative motions according to the information of the M relative motions and the dimension of the pixel.

8. A positioning and measuring system, comprising:
   an image capturing device performing image capturing operations on an object;
   a driving mechanism mechanically connected to one or both of the image capturing device and the object to cause a relative movement between the image capturing device and the object; and
   a processor, which is electrically connected to the image capturing device and the driving mechanism and performs steps of:
   (a) controlling the image capturing device to capture N portions of the object to generate N images before and after controlling the driving mechanism to cause M relative motions between the object and the image capturing device, where N is a positive integer greater than or equal to 2, M is equal to (N−1), and neighboring two of the N images partially overlap with each other; and
   (b) extracting feature points of each of the N images, and respectively performing cross-image feature point matching according to the feature points of every neighboring two of the N images to obtain information of the M relative motions, wherein the feature points correspond to unique surface morphology of the object, wherein the processor further performs, before the step (a), steps of:

(a1) controlling the image capturing device to capture a calibration sheet with a magnification power to obtain a calibration sheet image, wherein the image capturing device captures the calibration sheet and the object with the magnification power; and (a2) processing the calibration sheet image to obtain a dimension of one pixel, wherein the processor further determines a dimension corresponding to the information of the M relative motions according to the information of the M relative motions and the dimension of the pixel, wherein in the step (a1), the processor controls the image capturing device to capture the calibration sheet with multiple focal lengths to obtain multiple focusing images, transforms the focusing images into a frequency domain to obtain multiple spectrograms, selects one of the spectrograms, which has a most obvious signal presented in an intermediate frequency portion, and captures the calibration sheet with the focal length corresponding to the spectrogram to obtain the calibration sheet image.

* * * * *